United States Patent
Nemoto (10) Patent No.: US 7,242,567 B2
(45) Date of Patent: Jul. 10, 2007

(54) ACTUATOR DRIVE CONTROLLER

(75) Inventor: Hirotomi Nemoto, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 110 days.

(21) Appl. No.: 10/919,141

(22) Filed: Aug. 16, 2004

(65) Prior Publication Data

US 2005/0056981 A1    Mar. 17, 2005

(30) Foreign Application Priority Data

Sep. 17, 2003   (JP) ............................. 2003-323889

(51) Int. Cl.
*H01H 47/00* (2006.01)
(52) U.S. Cl. ...................................... 361/152
(58) Field of Classification Search ............... 361/152; 267/140.13
See application file for complete search history.

(56) References Cited

U.S. PATENT DOCUMENTS

| 5,293,076 A | * | 3/1994 | Fukui | 290/40 C |
| 5,947,456 A | * | 9/1999 | Aoki | 267/140.14 |
| 6,120,012 A | * | 9/2000 | Shibata et al. | 267/140.14 |
| 6,674,629 B2 | * | 1/2004 | Ozawa et al. | 361/154 |

FOREIGN PATENT DOCUMENTS

| JP | 07-027145 | 1/1995 |
| JP | 07-230888 | 8/1995 |
| JP | 2000-027933 | 1/2000 |
| JP | 2001-280417 | 10/2001 |

* cited by examiner

*Primary Examiner*—Michael Sherry
*Assistant Examiner*—Lucy Thomas
(74) *Attorney, Agent, or Firm*—Carrier, Blackman & Associates, P.C.; Joesph P. Carrier; William D. Blackman (57) ABSTRACT

An actuator drive controller is equipped with a power source for supplying power to an actuator; a voltage detector for detecting a voltage of the power source; and a controller for controlling a current supplied to the actuator, based on the voltage detected. When the voltage becomes not more than a reference value, the controller controls the current supplied to the actuator so as to become lower than a current set in advance, depending on consumption power of the actuator, in a case that the consumption power of the actuator is not less than a specified value set in advance.

14 Claims, 5 Drawing Sheets

ACTUATOR DRIVE CONTROLLER

BACKGROUND OF THE INVENTION

1. Field of the Invention

The present invention relates to an actuator drive controller, and more particularly, for example, to the actuator drive controller used for controlling an actuator for an automobile such as the actuator of an active control engine mount.

2. Description of the Related Art

Conventionally, there is known an active control engine mount that cancels an uncomfortable vibration for a driver by expecting a vibration input of an engine from a crank pulse and actively controlling vibration absorption characteristics of the engine mount that is arranged so as to support the engine (for example, see paragraphs 0009 to 0019 and FIG. 1 of Japanese Patent Laid-Open Publication 2000-27933). The active control engine mount is composed of a mount part for supporting the engine and an actuator arranged at a lower portion of the mount part. In the active control engine mount the actuator is designed to generate such a vibration that cancels the vibration of the engine. And the vibration generated by the actuator is transmitted to the mount part, and thereby the vibration of the engine is cancelled.

Generally, with such an actuator a voltage applied to it is increased by a voltage boost circuit in order to improve various performances of the active control engine mount. In addition, the voltage boost circuit is designed to increase a current in order to assure a voltage boost performance when a voltage of a power source of the actuator becomes not more than ($\leqq$) a predetermined value.

Meanwhile, because a battery voltage lowers with such an actuator drive controller as described above, a current increases by the voltage boost circuit therefore, something, which can endure a larger current, as electric contact points such as a terminal of the voltage boost circuit and circuit components such as a harness and a fuse, becomes necessary. Accordingly, there occurs a problem that the actuator drive controller is enlarged and production cost becomes high. Consequently, it can be considered to provide another actuator drive controller which controls the current so as not to exceed a predetermined value by monitoring the current entering the voltage boost circuit. However, because in the actuator drive controller the voltage boost circuit becomes complex, problems such as the enlargement of the controller and the high cost are not solved. In addition, if the current supplied to the actuator is controlled like the actuator drive controller depending on the monitored current, the current supplied to the actuator is determined regardless of a movement of the actuator. That is, the actuator drive controller cannot accurately control the current supplied to the actuator.

Consequently, a desideratum remains in the art for an actuator drive controller that can accurately control the current supplied to the actuator, and is also inexpensive to manufacture and miniature in size.

The inventor has achieved the present invention not by conventionally monitoring a current when a voltage of a power source lowers, but based on knowledge that the problem described above can be solved by regulating consumption power of an actuator itself and thus controlling the current.

According to a first aspect of the present invention for solving the problem, there is provided an actuator drive controller that comprises a power source which supplies power to an actuator; a voltage detector which detects a voltage of the power source; and a control means for controlling a current supplied to the actuator, based on the voltage detected by the detector, wherein when the voltage becomes not more than ($\leqq$) a reference value set in advance, the control means controls the current supplied to the actuator so as to be lower than another current set in advance, depending on consumption power of the actuator, in a case that the consumption power of the actuator is not less than ($\geqq$) a specified value set in advance.

In the actuator drive controller the voltage of the power source of the actuator is detected by the voltage detector. On the other hand, based on the detected voltage, the control means determines whether or not the voltage of the power source becomes not more than ($\leqq$) the reference value set in advance. And the controller determines whether or not the consumption power of the actuator is not less than the specified value set in advance. Then, when determining that the consumption power of the actuator is ($\geqq$) not less than the specified value set in advance, the controller controls the current supplied to the actuator so as to be lower than the current set in advance, depending on the consumption power of the actuator. In other words, when the consumption power of the actuator is large (when a movement of the actuator is large), the current supplied to the actuator is controlled so as not to flow at not less than an allowable value in a case that the voltage of the power source lowers as described above. Meanwhile, when lowering the current supplied to the actuator, a lowering factor of the current is preferably set so that a performance of the actuator is at least maintained at a lowest operable limit therefor.

In addition, in the actuator drive controller the actuator may be driven by a duty ratio set in advance. Furthermore, in the actuator drive controller, when the voltage of the power source is not more than the reference value and the consumption power is not less than the specified value, the controller may be designed to control or change the duty ratio and thereby regulate the current.

According to a second aspect of the present inventions, in the actuator drive controller described in the first aspect the control means controls the current supplied to the actuator, based on the duty ratio set in advance depending on the consumption power of the actuator; and when the voltage is not more than the reference value and the consumption power of the actuator is not less than the specified value, the control means controls the current supplied to the actuator so as to become smaller than the duty ratio set in advance, based on a compensation duty ratio that is compensated.

In accordance with the actuator drive controller described in the first aspect, when the voltage of the power source lowers, the controller can be made to control the current so as not to exceed the predetermined value, for example. Therefore, something which can endure a larger current, as electric contact points such as a terminal of a voltage boost circuit and circuit components such as a harness and a fuse, is not required. In addition, because it is not required to monitor a current that is input to the voltage boost circuit, the controller does not become complex. Accordingly, in accordance with the present invention described in the first aspect an inexpensive and miniature actuator drive controller can be provided.

In addition, in accordance with the actuator drive controller, because when the voltage of the power source becomes not more than the reference value and the consumption power of the actuator is not less than the specified value, the current can be regulated by lowering the consumption power of the actuator itself, the current supplied to the actuator can be more accurately controlled.

In accordance with the actuator drive controller described in the second aspect of the invention, because the current is controlled, based on the duty ratio set in advance depending on the consumption power of the actuator, the current supplied to the actuator can be accurately controlled, depending on the movement of the actuator.

DESCRIPTION OF THE PRESENT EMBODIMENT

Here will be described the embodiment of the present invention in detail, referring to drawings as needed.

First, in advance of describing an actuator drive controller according to the embodiment, there will be described an active control engine mount (hereinafter referred to as ACEM) comprising an actuator controlled by the actuator drive controller.

Figure 1:
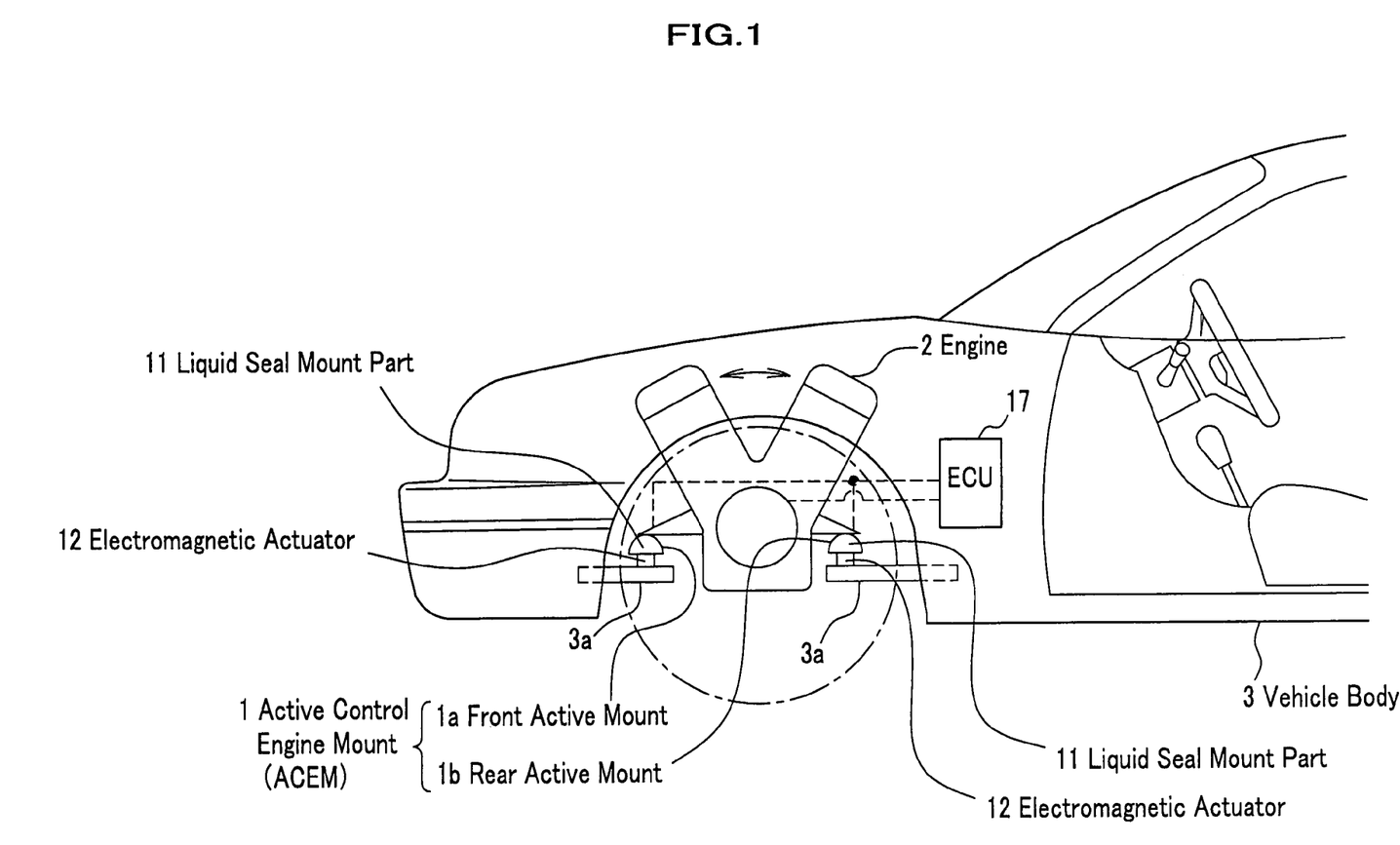
FIG. 1 is a schematic drawing of a vehicle including an actuator drive controller according to an embodiment of the present invention.

As shown in FIG. 1, an ACEM 1 is attached to a support frame 3a provided at a vehicle body 3 so as to support an engine 2. In this connection, in the embodiment the engine 2 is a V6 cylinder engine and the ACEM 1 prevents a vibration of the engine 2 from being transmitted to the vehicle body 3, which vibration augments when stopping three cylinders on one side of the engine 2 in driving.

The ACEM 1 comprises a front active control engine mount 1a for supporting the engine 2 at a front side of the vehicle body 3 and a rear active control engine mount 1b for supporting the engine 2 at a rear side of the vehicle body 3. Each of the front active control engine mount 1a and the rear active control engine mount 1b is electrically connected to an ECU 17 (Electronic Control Unit) that controls them. In addition, the ECU 17 is electrically connected to a rotation speed detection sensor 2a and an error sensor 2b both described later (both, see FIG. 3) provided at the engine 2.

Figure 2:
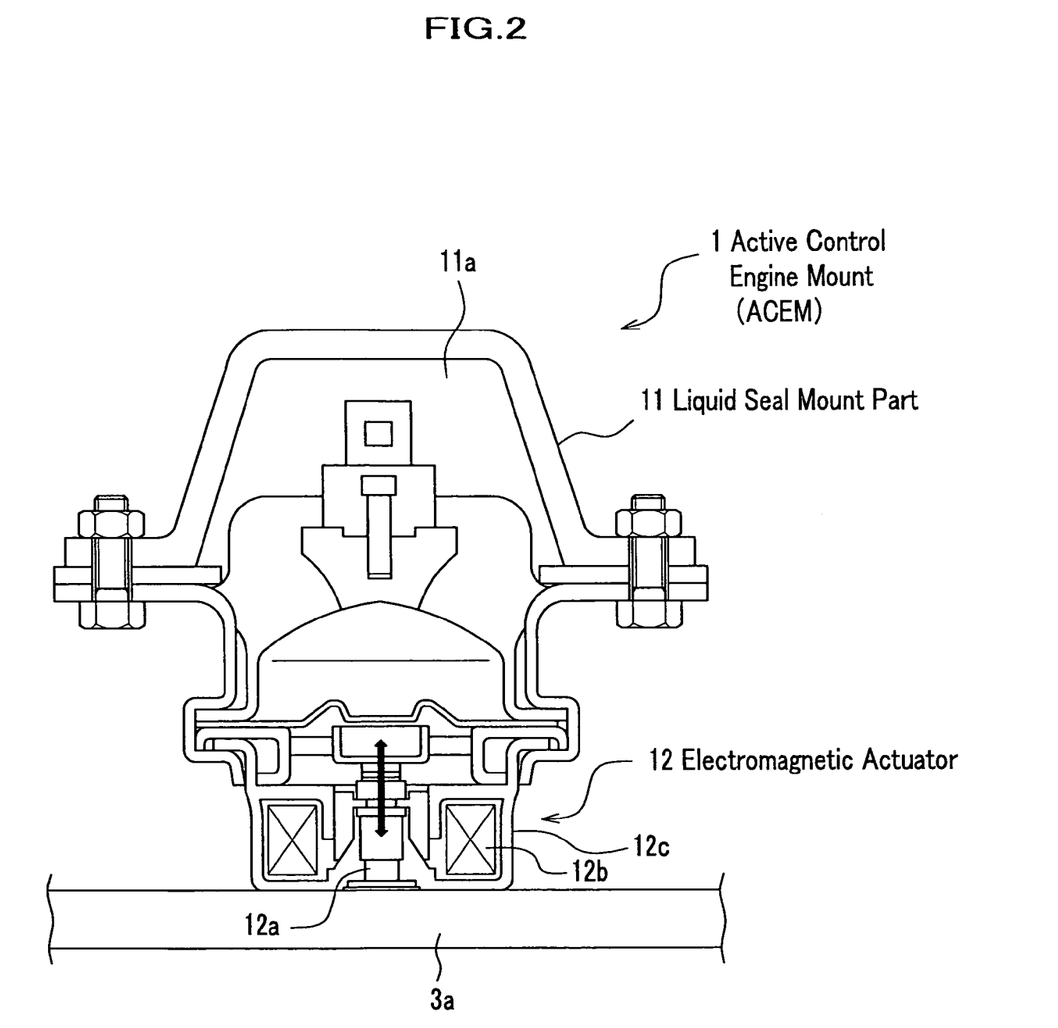
FIG. 2 is a conceptual drawing of an active control engine mount comprising an actuator controlled by the actuator drive controller according to the embodiment.

As shown in FIG. 2, the ACEM 1 comprises a liquid seal mount part 11 and an electromagnetic actuator 12 provided at a lower portion of the liquid seal mount part 11. In the liquid seal mount part 11 functional liquid is sealed in a hollow portion 11a thereof, and the liquid seal mount part 11 is designed to be fixed at the engine 2 so as to support the engine 2 from a lower side thereof and thereby transmit a vibration of the engine 2.

The electromagnetic actuator 12 comprises a magnetic core 12a extending in an up/down direction, a solenoid coil 12b arranged so as to surround the magnetic core 12a, and a casing 12c for housing the magnetic core 12a and the solenoid coil 12b. And the electromagnetic actuator 12 is fixed on the support frame 3a of the vehicle body 3 through the casing 12c.

The electromagnetic actuator 12 is designed so that the magnetic core 12a reciprocatingly moves in the up/down direction so as to generate a vibration of a reverse phase for one that the engine 2 generates by a current, which is controlled by the ECU 17, being supplied to the solenoid coil 12b as described later.

And the ACEM 1 is designed so that the electromagnetic actuator 12 damps the vibration of the engine 2 transmitted to the liquid seal part 11 by the vibration of the reverse phase.

Next, will be described the actuator drive controller related to the embodiment.

Figure 3:
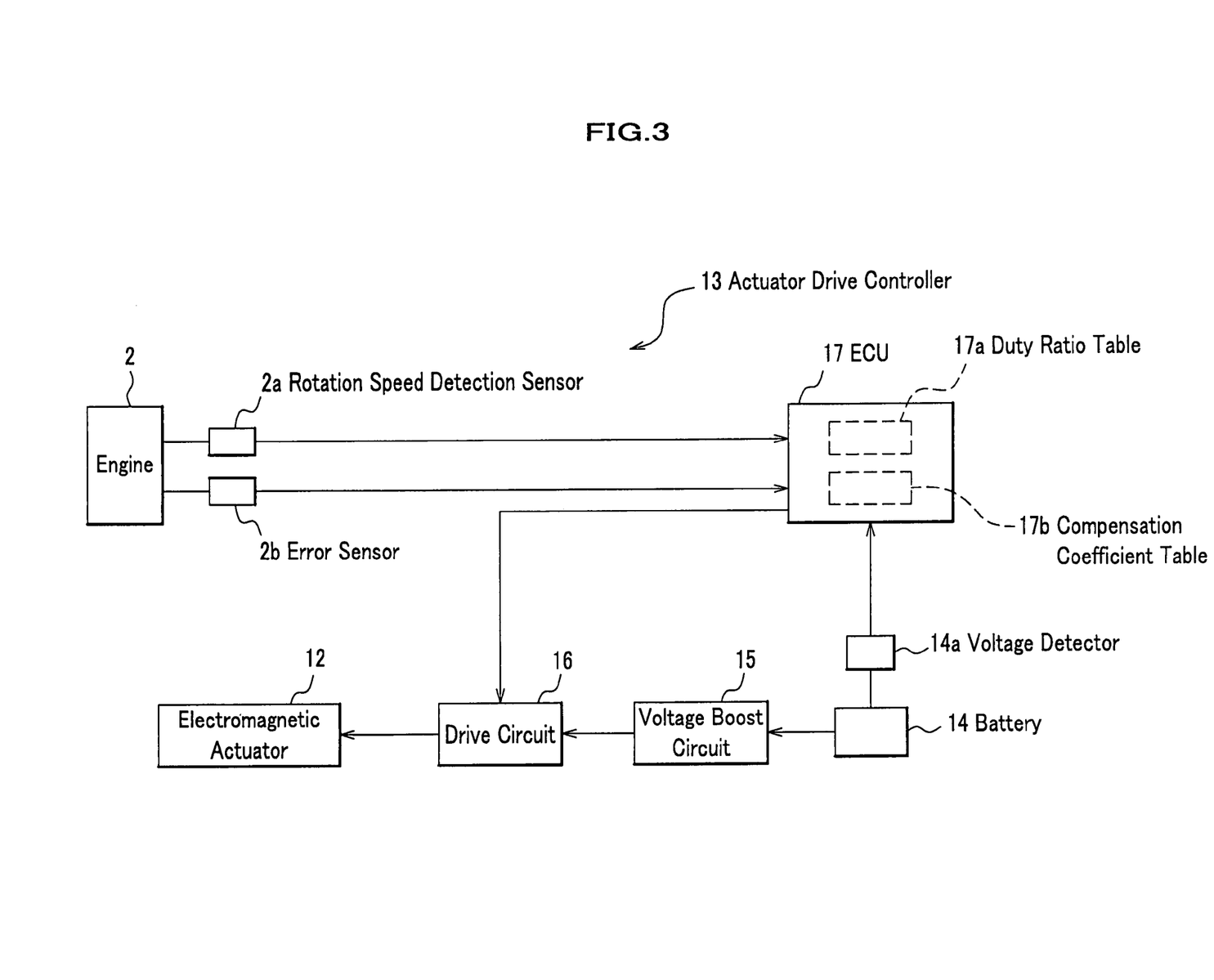
FIG. 3 is a block diagram of the actuator drive controller according to the embodiment.

As shown in FIG. 3, an actuator drive controller 13 comprises the rotation speed detection sensor 2a, the error sensor 2b, a battery 14, a voltage detector 14a, a voltage boost circuit 15, a drive circuit 16, and the ECU 17.

The rotation speed detection sensor 2a is attached to a casing (not shown) of the engine 2 and is designed to count a ring gear (not shown) of a flywheel of the engine 2, detect a pulse signal thereof, and output the pulse signal to the ECU 17.

The error sensor 2b is attached below the engine 2 so as to support it and is designed to detect an error vibration such as a vibration and an acceleration rate added to the vehicle body 3 (see FIG. 1) and output an error signal to the ECU 17.

The battery 14 is a variable power source for driving the actuator 12, and the voltage detector 14a is designed to detect a voltage of the battery and output a voltage detection signal to the ECU 17.

The voltage boost circuit 15 is electrically connected to the battery 14 and is designed to increase, for example, a voltage of around 12 V of the battery 14 to around 24 V in order to improve various performances of the ACEM 1. In addition, in the embodiment the voltage boost circuit 15 is designed to increase a current when the voltage of the battery 14 lowers, for example, to not more than 10V and lower the current when the voltage of the battery 14 becomes not less than 16V.

The drive circuit 16 is designed for the current increased in the voltage boost circuit 15 to be input; for itself to receive a pulse width modulation signal (hereinafter referred to as PWM signal) described later, which is output from the ECU 17; and so as to thereby output such a drive current to the electromagnetic actuator 12 that it generates the vibration of the reverse drive controller related according to the embodiment. phase.

The ECU 17 includes a CPU, a ROM, and a RAM not shown and is designed to control the electromagnetic actuator 12, based on a control program stored in the ROM. The ECU 17 comprises a circuit (not shown) for outputting such a PWM signal that the electromagnetic actuator 12 generates the vibration of the reverse phase to that of the engine 2. The circuit may be a known configuration, and it is available, for example, such as one that comprises a memory unit for storing largeness (estimate) of the vibration of the engine 2 set in advance, depending on a rotation speed of the engine 2; and an adaptive control unit that refers to the memory unit based on a detected rotation speed of the engine 2, derives the largeness (estimate) of the vibration of the engine 2, and outputs the PWM signal for making the electromagnetic actuator 12 generate the vibration of the reverse phase to that of the engine 2 so as to damp the vibration of the engine 2, based on an error signal from the error sensor 2b. As such, the circuit, for example, can be cited one that is disclosed in Japanese Patent Laid-Open Publication Hei 07-027 145.

In addition, when driving the electromagnetic actuator 12 based on such PWM signal, the ECU 17 is designed as follows. In order to control a request voltage of the electromagnetic actuator 12 depending on the voltage of the battery 14, eventually, the ECU controls the current supplied to the electromagnetic actuator 12 by controlling the request current thereof.

The ECU 17 comprises a duty ratio table 17a and a compensation coefficient table 17b, and these tables are set in the ROM (not shown) thereof.

In the duty ratio table 17a is stored a duty ratio for driving the electromagnetic actuator 12. The duty ratio is something for deciding request power (consumption power) of the electromagnetic actuator 12. Because the request power of the electromagnetic actuator 12 is decided in accordance with the rotation speed of the engine 2 and the largeness (estimate) of the vibration of the engine 2, the duty ratio is set corresponding to the rotation speed and the largeness of the vibration.

Figure 4:
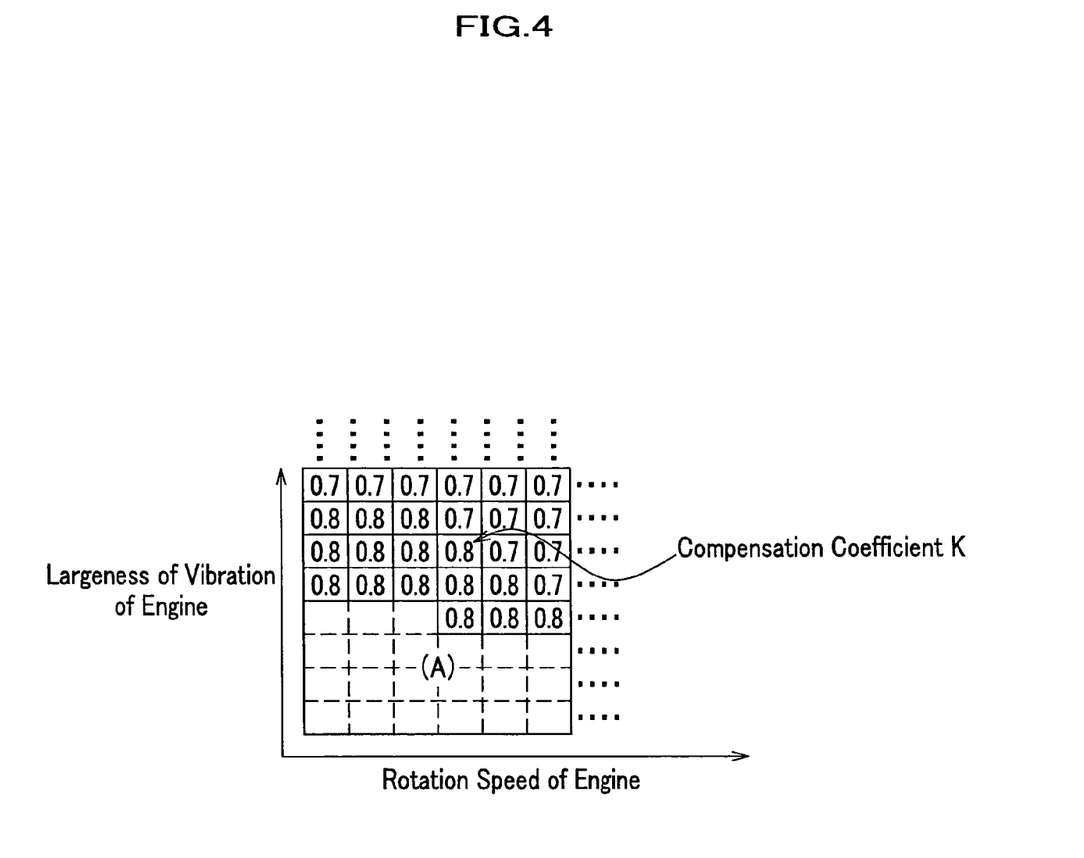
FIG. 4 is a drawing showing one example of a map of compensation coefficients stored in a compensation coefficient storage table of an ECU17 composing the actuator drive controller according to the embodiment.

In the compensation coefficient table 17b is stored a compensation coefficient K ($0<K<1$) for compensating the duty ratio. When the voltage of the battery 14 is not more than the reference value (in the embodiment the reference value is set to 10 V), the compensation coefficient K is something for compensating the duty ratio and is set, depending on the voltage of the battery 14 and the request power of the electromagnetic actuator 12. Because the request power of the electromagnetic actuator 12 is decided in accordance with the rotation speed of the engine 2 and the largeness (estimate) of the vibration of the engine 2 as described above, the compensation coefficient table 17b can be configured, as shown in FIG. 4, of a map of the compensation coefficient K related to the rotation speed of the engine 2 and the largeness (estimate) of the vibration of the engine 2. In the compensation coefficient table 17a plurality of such maps are set, depending on the voltage of the battery 14. And the faster the rotation speed of the engine 2 and the larger the vibration of the engine 2 becomes. In other words, the larger the request power of the electromagnetic actuator 12 becomes, the smaller the compensation coefficient K becomes. Meanwhile, in the compensation coefficient K an area A, where it is not written, is an area where the request power of the electromagnetic actuator 12 is less than the specified value and the duty ratio is not compensated, that is, the compensation coefficient K=1.

In addition, the ECU 17 is designed to input a pulse signal (crank pulse) from the rotation speed detection sensor 2a, refer to the duty ratio table 17a, and derive the rotation speed of the engine 2 decided by the pulse signal (crank pulse) and the duty ratio corresponding to the largeness of the vibration of the engine 2 expected from the rotation speed. And the ECU 17 is designed to output the PWM signal so that the electromagnetic actuator 12 is driven with the duty ratio.

Furthermore, the ECU 17 is designed to input the voltage detection signal from the voltage detector 14a, refer to the compensation coefficient table 17b in a case that a detection voltage is not more than the reference value (10 V), and derive the compensation coefficient K corresponding to the voltage. And the ECU 17 is designed to multiply the duty ratio derived as described above by the compensation coefficient K and thereby compute a compensation duty ratio. Then, the ECU 17 is designed to output the PWM signal so that the electromagnetic actuator 12 is driven with the compensation duty ratio.

Next, will be described an operation of the actuator drive controller 13 thus configured, referring to drawings as needed. In the drawings FIG. 5 is a flowchart illustrating the operation of the actuator drive controller 13.

First, by an ignition switch (not shown) of a vehicle being made ON, the engine 2 (see FIGS. 1 and 3) starts, and then the actuator drive controller 13 starts. And the actuator drive controller 13 outputs the PWM signal to the drive circuit 16, based on the pulse signal (crank pulse) that is output from the rotation speed detection sensor 2a and an error signal from the error sensor 2b. On the other hand, a voltage increased to a predetermined voltage through the voltage boost circuit 15 is input to the drive circuit 16 from the battery 14. And the drive circuit 16 receives the PWM signal that is output from the ECU 17 and thereby outputs such a drive current to the electromagnetic actuator 12 that it generates the vibration of the reverse phase to electromagnetic actuator 12 that of the engine 2. Then, in accordance with the drive current the electromagnetic actuator 12 generates the vibration of the reverse phase and damps the vibration of the engine 2. In this connection, the request power of the electromagnetic actuator 12 at this time is decided by the duty ratio which the ECU 17 derives from the duty ratio table 17a, based on the rotation speed of the engine 2 decided by the pulse signal (crank pulse) from the rotation speed detection sensor 2a and the largeness of the vibration of the engine 2 expected from the rotation speed.

Figure 5:
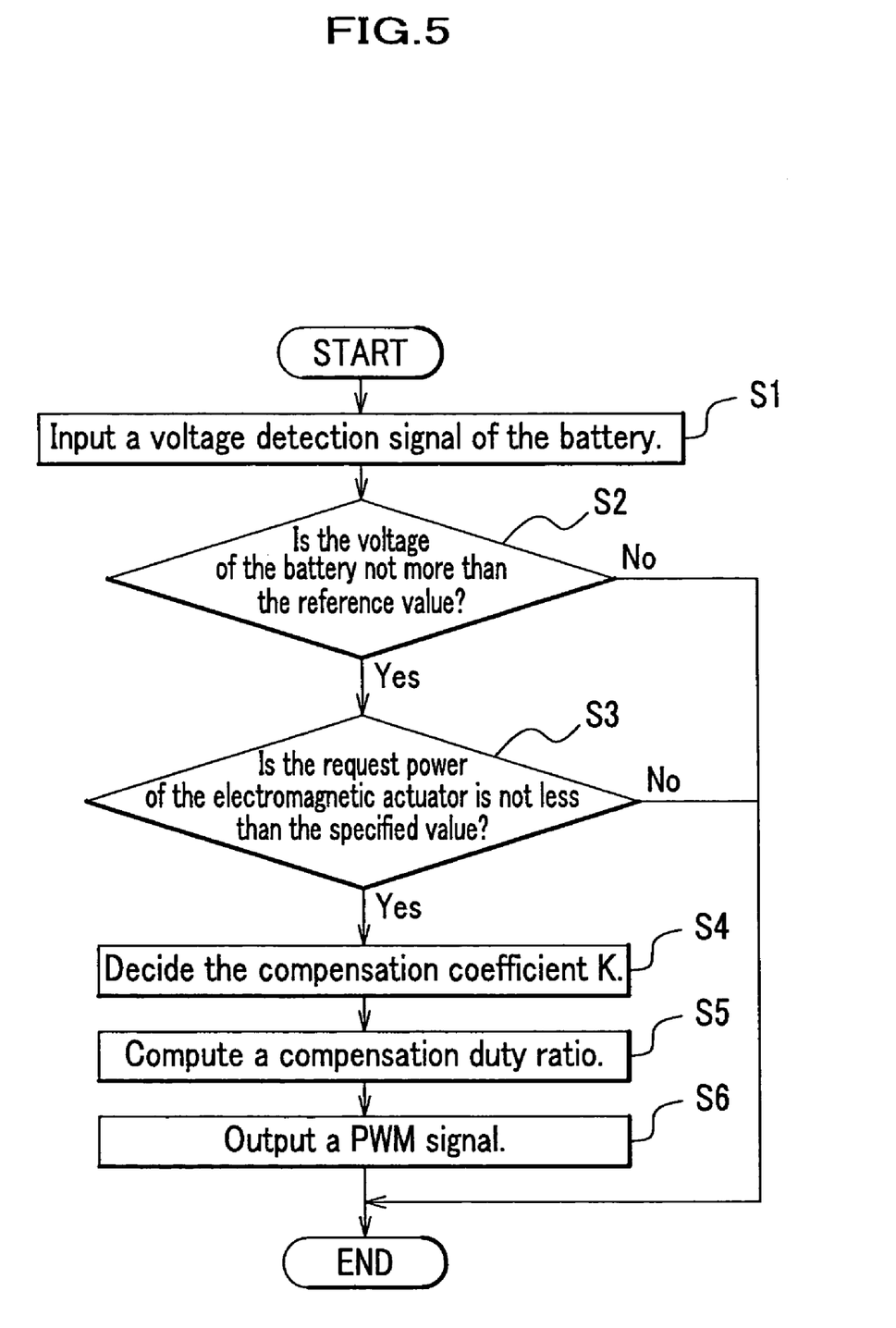
FIG. 5 is a flowchart illustrating an operation of the actuator drive controller according to the embodiment.

Thus, when the electromagnetic actuator 12 is driven, in the actuator drive controller 13, as shown in FIG. 5, the voltage detector 14a detects a voltage of the battery 14 and the ECU 17 inputs a voltage detection signal (step S1). And the ECU 17 specifies the voltage of the battery 14, based on the voltage detection signal, and determines whether or not the voltage of the battery 14 is not more than ($\leq$) the reference value (step S2). When the voltage of the battery 14 exceeds the reference value at this time (NO in the step S2), a subroutine shown in the flowchart ends. As the result, the electromagnetic actuator 12 is driven with the uncompensated duty ratio.

On the other hand, when the voltage of the battery 14 is not more than the reference value (YES in the step S2), move to a next step S3. In the step S3 the ECU 17 determines whether or not the request power of the electromagnetic actuator 12 is not less than the specified value. When the request power is less than ($\geq$) the specified value at this time (NO in the step S3), the subroutine shown in the flowchart ends. As the result, the electromagnetic actuator 12 is driven with the uncompensated duty ratio. That is, a current is supplied to the electromagnetic actuator 12 so that it is driven with the duty ratio.

In addition, when the request power is not less than the specified value (YES in the step S3), the ECU 17 inputs the voltage detection signal from the voltage detector 14a; and when a detection voltage is not more than the reference value (10 V), the ECU 17 refers to the compensation coefficient table 17b. And the ECU 17 decides the compensation coefficient K corresponding to the voltage in accordance with the rotation speed of the engine 2 specified by the pulse signal (crank pulse) from the rotation speed detection sensor 2a and the largeness of the vibration of the engine 2 expected from the rotation speed (step S4). Next, the ECU 17 multiplies the duty ratio by the compensation coefficient K and thus computes a compensation duty ratio (step S5).

Then, the ECU 17 outputs the PWM signal so that the electromagnetic actuator 12 is driven with the compensation duty ratio (step S6) and thus the subroutine shown in the flowchart ends. In this connection, the electromagnetic actuator 12 is driven with the compensation duty ratio. That is, a current is supplied to the electromagnetic actuator 12 so that it is driven with the compensation duty ratio. Meanwhile, by multiplying the duty ratio by the compensation coefficient K ($0<K<1$), the current becomes lower than that in driving the electromagnetic actuator 12 with the uncompensated duty ratio.

Next, will be shown a control example of a current where the actuator drive controller 13 is used. In the control example is used the battery of a voltage of 12 V. The voltage of the battery 14 fluctuates due to a charge from a generator and power consumption of accessories (not shown). In addition, in the actuator drive controller 13 the duty ratio of the electromagnetic actuator 12 is set 83.3% ; the reference value of the voltage of the battery 14, 10 V; and the specified value of the request power of the electromagnetic actuator 12, 80 W. In Table 1 are shown values of the voltage of the battery 14, the supply current to the electromagnetic actuator 12, the request power of the electromagnetic actuator 12, an effective voltage of the electromagnetic actuator 12, the duty ratio of the electromagnetic actuator 12, and the compensation coefficient K in the control example.

TABLE 1

|  | Voltage of Battery | Supply Current to Electromagnetic Actuator | Request Power | Effective Voltage (Effective Current) | Duty Ratio (Compensation Duty Ratio) | Compensation Coefficient K |
|---|---|---|---|---|---|---|
| Control Example According to the Present Invention | 16 V | 6.25 A | 100 W | 20 V (5 A) | 83.3% | — |
|  | 14 V | 7.14 A | 100 W | 20 V (5 A) | 83.3% | — |
|  | 12 V | 8.33 A | 100 W | 20 V (5 A) | 83.3% | — |
|  | 10 V | 8.46 A | 84.6 W | 18.4 V (4.6 A) | (76.6%) | 0.92 |
| Comparison Example | 10 V | 10 A | 100 W | 20 V (5 A) | 83.3% | — |

Compensation duty ratio = Duty ratio × Compensation coefficient K

The control example shows a control condition of the current when the voltage of the battery 14 is any of 16, 14, 12, and 10 V, and as shown in Table 1, the current in the voltage of 16 V of the battery 14 is 6.25 A; that of 14V, 7.14 A; that of 12V, 8.33 A. Meanwhile, any of the request power of the electromagnetic actuator 12 is not less than the specified value.

In addition, when the voltage of the battery 14 is 10 V (not more than the reference value) and the request power of the electromagnetic actuator 12 is not less than the specified value, that is, 84.6 W, the actuator drive controller 13 derives a compensation coefficient of 0.92 and drives the electromagnetic actuator 12 with the compensation duty ratio, which is obtained by multiplying a duty ratio of 83.3% by the compensation coefficient. As the result, the current supplied to the electromagnetic actuator 12 becomes 8.46 A. The current becomes lower, compared to one, which is shown as a comparison example in Table 1 and where the duty ratio is not compensated.

In the actuator drive controller 13 related to the embodiment thus described, when the voltage of the battery 14 lowers, the current can be controlled so as not to exceed a predetermined value, for example. Therefore, something which endures a larger current, as electric contact points such as a terminal of the voltage boost circuit 15 and circuit components such as a harness and a fuse is not required. In addition, because it is not required to monitor the current that is input to the voltage boost circuit 15, it does not become complex. Accordingly, the actuator drive controller 13, which is inexpensive and miniature, can be provided.

In addition, when the voltage of the battery 14 becomes not more than the reference value (10 V) and consumption power of the electromagnetic actuator 12 becomes not less than a specified value, the actuator drive controller 13 can regulate the current by lowering the consumption power of the electromagnetic actuator 12 itself. Therefore the actuator drive controller 13 can more accurately control the current supplied to the electromagnetic actuator 12.

Furthermore, when a movement of the electromagnetic actuator 12 is small and the consumption power thereof is small, that is, the consumption power thereof is less than the specified value, the actuator drive controller 13 can set the current so that the electromagnetic actuator 12 operates with consumption power set in advance even in case that the voltage of the battery 14 becomes not more than the reference voltage, for example. Therefore, the actuator drive controller 13 can meticulously control the current, compared to an actuator drive controller that uniformly regulates the current, depending on a monitor current regardless of the movement of the electromagnetic actuator 12.

Thus, although the embodiment of the present invention is described, the invention is not limited thereto and various variations are available without departing from the spirit and scope of the invention. For example, although in the embodiment is shown an example of the present invention that is applied to the electromagnetic actuator 12 used for the ACEM 1, the invention is not limited thereto and may be applied to another actuator using a motor, a piezoelectric element, and the like.

In addition, although in the embodiment the request power of the electromagnetic actuator 12 is decided, based on the duty ratio stored in the duty ratio table 17a, the present invention is not limited thereto and may be designed to monitor an effective value of the voltage and the current in the electromagnetic actuator 12 and calculate the request power of the electromagnetic actuator 12 from the effective value of the voltage and the current.

What is claimed is:

1. An actuator drive controller comprising:
   a power source which supplies power to an actuator;
   a voltage detector which detects a voltage of said power source; and
   a control means for controlling a current supplied to said actuator, based on the voltage detected by said detector, wherein
   the actuator supports a vehicle engine and generates vibrations which dampens vibrations generated by the engine; and
   when said detected voltage is less than or equal to a reference value, and when consumption power of said actuator is greater than or equal to a specified value set in advance, said control means controls the current supplied to said actuator so as to be lower than a current value set in advance, depending on consumption power of said actuator,
   wherein the specified value of the consumption power is greater than zero.

2. An actuator drive controller according to claim 1, wherein
said control means controls the current supplied to said actuator, based on a duty ratio set in advance depending on the consumption power of said actuator, and wherein
when said detected voltage is less than or equal to said reference value and the consumption power of said actuator is greater than or equal to said specified value, said control means controls the current supplied to said actuator so as to become smaller than said duty ratio set in advance depending on the consumption power of said actuator, based on a compensation duty ratio that is compensated.

3. An actuator drive controller according to claim 1, wherein
when lowering the current supplied to the actuator, said control means controls the current supplied to said actuator such that a performance of the actuator is at least maintained at a lowest operable limit therefor.

4. An actuator drive controller according to claim 1, wherein
when the consumption power of the actuator is large, said control means controls the current supplied to said actuator such that the current does not flow at less than the current value set in advance in a case that the voltage of the power source lowers.

5. An actuator drive controller according to claim 1, wherein the power source is a battery.

6. An actuator drive controller according to claim 1, wherein the power source has a variable voltage.

7. An actuator drive controller according to claim 1, wherein the actuator is fixed at a lower portion of an active engine mount.

8. An actuator drive controller according to claim 1, wherein the actuator is driven in a plurality of positions during operation thereof.

9. An actuator drive controller according to claim 1, wherein the actuator generates vibrations of reverse phase to that of the engine vibrations.

10. An active engine mount comprising:
an actuator;
a power source which supplies power to the actuator;
a voltage detector which detects a voltage of said power source; and
a controller which controls a current supplied to said actuator based on the voltage detected by said detector and based on a consumption power of said actuator; wherein
when said detected voltage is less than or equal to a reference value, and when consumption power of said actuator is greater than or equal to a predetermined consumption power value, said controller controls the current supplied to said actuator so as to be lower than a predetermined current value, depending on consumption power of said actuator;
the predetermined consumption power value is greater than zero; and
the actuator is variably driven to dampen vibrations generated by the engine.

11. An actuator drive controller comprising:
a battery which supplies power to an actuator;
a voltage detector which detects a voltage of said battery; and
a controller which controls current supplied to said actuator, based on the voltage detected by said detector, wherein
when said detected voltage is less than or equal to a reference value, and when consumption power of said actuator is greater than or equal to a predetermined consumption power value, said control means controls the current supplied to said actuator so as to be lower than a predetermined current value, depending on consumption power of said actuator; and
the predetermined consumption power value is greater than zero.

12. An actuator drive controller according to claim 11, further comprising a voltage boost circuit connected to the battery, and wherein the voltage boost circuit increases voltage of the battery.

13. An actuator drive controller according to claim 11, wherein the actuator is fixed on to a support frame of a vehicle body.

14. An actuator drive controller according to claim 11, further comprising a liquid seal mount fixed to an engine of a vehicle, and wherein the actuator is fixed at a lower portion of the liquid seal mount.

* * * * *